March 25, 1952     H. E. DYCHE, JR     2,590,521
AIRPLANE STALL WARNING SYSTEM
Filed June 1, 1948
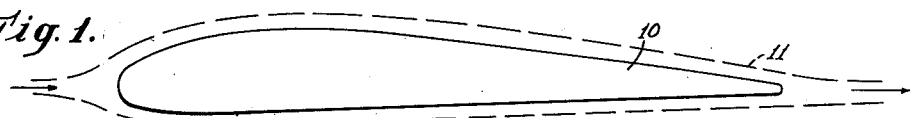
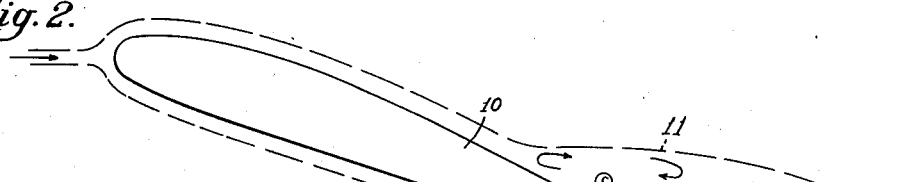
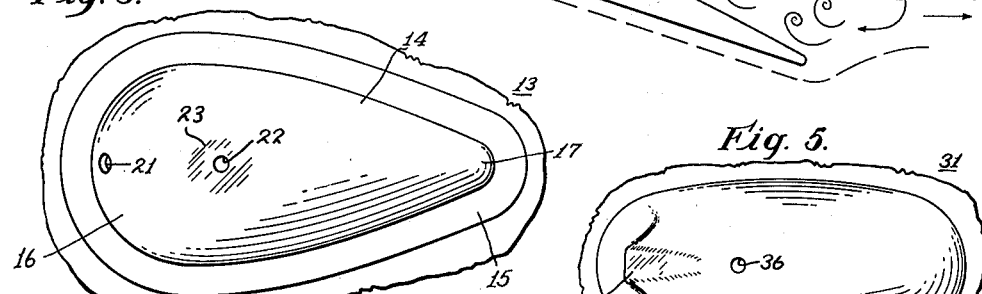
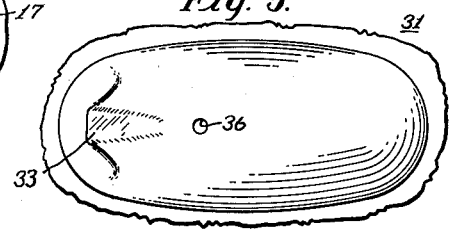
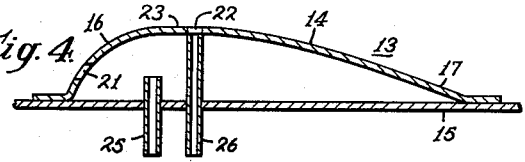
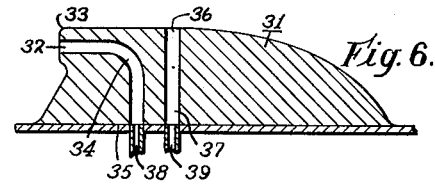
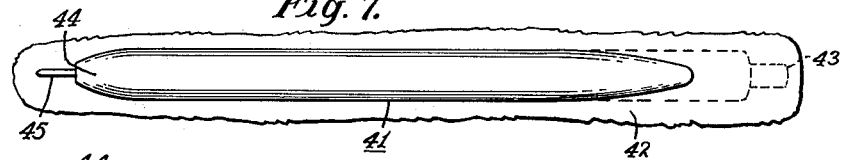
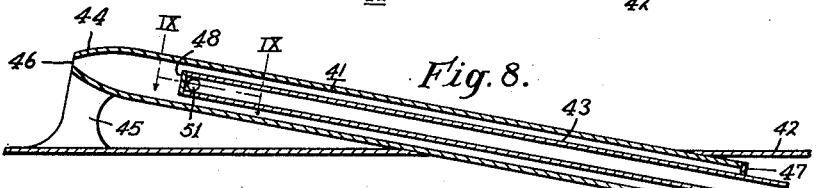
WITNESSES:
Edward Michaels
[signature]
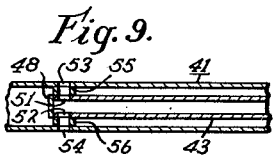
INVENTOR
Howard E. Dyche, Jr.
BY
[signature]
ATTORNEY Patented Mar. 25, 1952

2,590,521

UNITED STATES PATENT OFFICE 2,590,521

AIRPLANE STALL WARNING SYSTEM

Howard E. Dyche, Jr., Pittsburgh, Pa., assignor to Westinghouse Electric Corporation, East Pittsburgh, Pa., a corporation of Pennsylvania Application June 1, 1948, Serial No. 30,306

4 Claims. (Cl. 73—180)

My invention relates, generally, to pressure-differential devices and, more particularly, to such devices in the form of heads or blisters for use on airplanes in connection with stall warning systems for supplying a pressure-differential separately to a pressure responsive control device, or to effect an airflow in a control device, both in accordance with conditions of airflow over the upper surface of the wing of a plane in a region adjacent the upper trailing edge of the wing.

In the use of the various types of stall warning systems for airplanes, which function in response to the fundamental cause of a stall, namely, the change from laminar to turbulent airflow over the trailing upper surface of the wing, it is necessary to employ a device which may be readily mounted upon the upper surface of a wing in the proper position and which will function to supply a pressure-differential which is used directly, or to cause an airflow in accordance therewith, to control the operation of other devices and/or circuits which, in turn, control the operation of a warning device usually in the form of an electrically-operated horn or a lamp. In the control of a warning device, a control relay may be employed and the relay controlled in various ways to effect the operation of the warning device in response to an incipient stall condition of a wing. In general, the control relay may be controlled by a bridge circuit, a hot wire device, or any other suitable device which, for its proper functioning, requires an airflow over certain parts or elements thereof in accordance with the airflow conditions over the upper surface of the wing. Other transducers may use the pressure-differential directly without subsequent airflow to effect the operation of the warning system.

It is to that part of the system which produces or supplies the pressure-differential and the consequent airflow through, or pressure-differential to, the control device that my invention is directed.

Heretofore, attempts have been made to provide pressure-differential devices for use in such systems, but these devices have not been altogether satisfactory for the reason that they are not highly sensitive to airflow conditions over the upper surface of the wing. A device of this type to be successful and reliable in operation so as to accurately detect the approach to a stalling condition must be sensitive to the turbulent condition of the airflow under approaching and actual stalling conditions and must produce results as near to the ideal as possible. The ideal operation is one in which the pressure-differential device maintains a maximum pressure-differential up until the change from laminar to turbulent airflow is reached, at which time this pressure-differential should drop immediately to approximately zero and remain on that level throughout the subsequent stalling condition.

This result must be produced as near as possible with a very small device which offers low resistance to airflow thereover and which is not affected in any way by the thin boundary layer of turbulent airflow over the wing surface during normal flight conditions. It must, however, be as sensitive as possible to the change from laminar to turbulent airflow in the region of the trailing edge of the wing as a stalling condition is approached.

Accordingly, it is an object of my invention, generally stated, to provide a device of the character described for use in stall warning systems for supplying an airflow in accordance with a pressure-differential, or a pressure-differential only, for control purposes and which results from changes in the conditions of airflow over the upper surface of the wing.

A more specific object of my invention is to provide a device of this general character which may be readily mounted upon the upper surface of the wing for supplying a pressure-differential only, or an airflow in accordance therewith, which shall be of simple and rugged design offering minimum resistance to the flow of air over the wing surface, and which shall function effectively to supply the necessary pressure differential or airflow for control purposes and be sensitive to changes in airflow conditions over the upper surface of the wing.

Another object of my invention is to provide a device of this kind wherein the pressure-differential is produced in response to air flowing over the device by means of inlet or outlet openings in the device disposed in predetermined relationship to each other and with respect to the leading and trailing edges of the wing.

A further object is to provide a device of this kind having inlet and outlet openings disposed at right angles to each other with the inlet opening facing the leading edge of the wing and the outlet opening facing in a direction at right angles thereto.

These and other objects of my invention will become more apparent from the following detailed description when considered in connection with the drawing, in which:

Figure 1 is a diagrammatic view of a section of a typical airplane wing or air foil showing conditions of airflow over the upper and lower surfaces of the wing during normal flight conditions.

Fig. 2 is a similar view showing the conditions of air flow, particularly over the upper surface, as the wing approaches a stalling condition.

Fig. 3 is a top plan view of one embodiment of my invention in the form of a housing or blister which may be mounted upon the upper surface of a wing.

Fig. 4 is a side elevational view in section of the device of Fig. 3.

Fig. 5 is a top plan view of another embodiment of my invention in the form of a streamlined solid head.

Fig. 6 is a side elevational view in section of the head of Fig. 5.

Fig. 7 is a top plan view of a third embodiment in my invention in the form of a modified Pitot tube device.

Fig. 8 is a side elevational view in section of the device of Fig. 7, and

Fig. 9 is a partial view in cross section taken along the lines IX—IX viewed from the top of Fig. 8 to show structural details.

In practicing my invention, in whatever detailed form it may take, I make use of a pair of spaced openings, that is, an inlet opening and an outlet opening disposed in such angular relationship as to effectively produce a pressure differential therebetween whether it is produced within the interior of the device or in a closed chamber or housing connected therewith by suitable passages or conduits.

In my device in the form of a hollow blister, the inlet opening is in the front face or nose portion of the blister and the outlet opening is in the relatively flat top portion thereof, these openings being disposed generally at right angles to each other with the inlet opening facing the front of the wing, that is, into the direction of normal airflow over the wing surface. The inlet opening is positioned at such height above the wing or base of the blister as to be outside the normally thin turbulent boundary layer of air. It is preferable that the plane of the inlet opening be in a vertical position or perpendicular to the wing surface, if possible, and the plane of the outlet opening be disposed at right angles thereto, that is, horizontal to the wing surface.

In the streamlined head form, the inlet opening is in the front end facing the leading edge of the wing and is located in a vertical flat portion thereof, which may be termed the nose portion, and is connected to an opening in the base by means of a suitable passage. The outlet opening is in the relatively flat and straight top portion of the head and may continue as a straight passage to the base of the head.

In the modified Pitot tube form, the main or outer tube is mounted in an inclined position downwardly from the nose on a suitable mounting plate having an elongated slot therein through which the lower end of the tube extends. The inlet opening is in the nose of the tube and the outlet openings, of which there may be two, are on opposite sides of the main tube adjacent the nose. The main tube is closed at its rear end and adjacent thereto is a discharge opening or connection. An inner or auxiliary tube is mounted within the main tube with its open rear end extending through the closed rear end of the main tube, and its closed front end being disposed behind and in spaced relation with the inlet opening in the nose of the main tube. The front end of the auxiliary tube is provided with side openings corresponding to the outlet openings in the main tube and these openings are connected by short connecting tubes, thus communicating to the outside of the main tube.

In all of these different embodiments of my invention, the inlet and outlet openings are disposed, generally, at right angles to each other and are so spaced and otherwise related as to respond effectively to changes in airflow conditions to which the devices are subjected and to which they are intended to accurately respond. While it is preferable to have the plane of the front or inlet opening in a vertical position, the plane of the front opening may be slightly inclined backwardly as in the case of the blister form, Fig. 4, and the modified Pitot tube form, Fig. 8. Likewise, it is preferable that the outlet opening be in a plane which is parallel to the direction of normal airflow.

Referring now to the drawing and to Figs. 1 and 2, in particular, there is shown in Fig. 1 a wing or air foil section 10 under normal flight conditions in which the airflow over the upper surface of the wing, is smooth or laminar, as indicated by the dash line 11. In Fig. 2, the wing 10 is shown in a stalling or near stalled condition, in which the airflow 11 over the upper surface of the wing has changed from a laminar flow to a turbulent flow, as indicated by the arrows 12. This turbulence begins at the trailing edge of the wing and progresses forwardly and spanwise outwardly as the complete stall is approached. It is this change in airflow conditions from laminar to turbulent that the devices of my invention are intended to accurately and positively respond in supplying a pressure-differential in accordance therewith.

Referring now to Figs. 3 and 4 which illustrate one embodiment of my invention in the form of a hollow housing or blister 13 which may be formed of a single sheet of material pressed into the desired shape. As shown, the blister 13 comprises a body portion 14 and a base portion 15 which may be a separate member or a portion of the wing surface.

It will be observed that the housing 14 is of a modified tear-drop design, being elongated and having a relatively blunt front nose portion 16 tapering into a relatively sharp tail portion 17. It will be understood from Fig. 4 that the longitudinal cross sectional shape is streamlined and also that the housing 14 is rounded and streamlined in the transverse section.

In order to provide for producing a pressure-differential, the housing is provided with a front opening 21 in the nose portion 16 and an outlet opening 22 in the relatively flat top portion 23. It will be observed that the inlet opening 21 is facing against the direction of normal airflow over the wing surface, as indicated in Fig. 1, and spaced above the base 15 in order that it is above the thin boundary layer of turbulent airflow. The plane of the inlet opening 21 in this instance is inclined backwardly slightly from the vertical, but it is in a generally vertical position so as to be as effective as possible in utilizing the velocity or dynamic head.

The outlet opening 22 is in a plane which is parallel to the direction of normal airflow and accordingly can not use the velocity head but contributes to the maximum differential produced by a small amount of suction effect, on the order of 20 percent.

Accordingly, it will be apparent that these openings 21 and 22 are disposed at substantially right angles to each other and in such spaced relationship that they will function to produce the necessary maximum pressure-differential under normal flight conditions.

In the particular form shown, the blister is provided with a discharge tube or connection 25 communicating with the inlet opening 21 and an inlet tube or connection 26 communicating with the outlet opening 22. It is to be understood that these tubes or connections 25 and 26 are intended for the purpose of making connections of the blister to a suitable air-tight housing, not shown, in which a control device or devices controlled by the pressure-differential or by the airflow in accordance with pressure-differential are located. In some instances, it may be desirable to locate the control device or a portion thereof within the blister, in which event the tubes 25 and 26 are not used and the airflow through the blister itself performs the necessary control functions.

Referring now to Figs. 5 and 6, there is shown another embodiment of my invention in the form of a streamlined head also adapted to be mounted upon the upper surface of the wing.

This device may be formed of a solid piece of material such as aluminum or plastic and attached directly to the wing surface. As shown, the body portion 31 of this device is in the shape of an elongated oval and has a generally vertical face or nose portion with a relatively flat or horizontal top portion. The contour or shape of the top portion is clearly shown in Fig. 6 and it will be observed that the front end of the top portion adjacent the nose is relatively straight for a considerable distance back toward the sloping rear end of the head. The head is provided with a front inlet opening 32 which is placed in the relatively flat and vertical nose portion 33. This opening extends through the body of the head in the form of a passage 34 and terminates in the base 35. The outlet or top opening is shown at 36 and extends downwardly through a passage 37 to the base 35.

It will be observed that the planes of the inlet and outlet openings 32 and 36 are, in this instance, disposed at right angles to each other, the plane of the inlet opening being vertical and at right angles to the direction of normal airflow while the plane of the outlet opening 36 is horizontal and parallel to the direction of normal airflow.

This type of head is particularly adapted for use as a pressure-differential supplying device rather than a housing for any part of the control equipment. It is to be understood, however, that if desired the head may be provided with a suitable cavity connected with the inlet and outlet openings 32 and 36 for receiving control equipment. The base is provided with tubular connections 38 and 39 for the purpose of connecting the head to an air-tight chamber or housing containing the control device or devices. Such connections would not be used if the head was provided with a cavity for control equipment.

Referring now to Figs. 7, 8 and 9 which show the modified Pitot type of head, it will be observed that this head is comprised of a main or outer tubular member 41 mounted in a backwardly inclined position on a base plate 42, and an inner or auxiliary tubular member 43 mounted within the outer member 41. The nose portion 44 of the outer member may be attached to the base plate 42 by means of a suitable strut 45.

The outer member 41 is provided with an inlet opening 46 in the front end thereof. It will be observed that the nose portion 44 is rounded or pointed to provide the necessary size of inlet opening and to give the outer member a certain amount of streamlining. The rear end of the outer member 41 is closed as at 47 and the inner member 43 extends through this closure 47 in airtight relation.

The inner member 43 may be mounted within the outer member 41 in concentric relation with its inner end 48 positioned directly back and in spaced relation with the inlet opening 46. The inner end 48 of the inner member is closed and a pair of oppositely disposed side openings 51 and 52 are provided adjacent the end.

As shown in Fig. 9, the outer member 41 is also provided with a pair of oppositely disposed side outlet openings 53 and 54 which are connected with the openings in the inner member by means of suitable conduits 55 and 56.

It will be understood that, in this instance, air flows into the inlet opening 46 and down the inside of the outer tube 41 to the discharge opening 57 and through the air-tight housing or control box to which the device is connected back through the open end of the inner tube 43, which may be termed the intake opening or connection, and out the side outlet openings 53 and 54 in the main tube 41.

In this instance, the plane of the inlet opening 46 is inclined slightly from the vertical but it is in a generally vertical position. The planes of the outlet openings 43 and 54 are generally parallel to the direction of normal airflow and are at right angles to the plane of the inlet opening 46.

It is to be understood that the inner and outer members 43 and 41 also may be mounted or positioned in non-concentric relation so that one side of the inner member engages the inner surface of the outer member with only a single side outlet opening.

In view of the foregoing detailed description of the three different embodiments of my invention, it will be apparent that I have provided a plurality of pressure-differential devices which may be readily applied to airplanes of almost any type for use in connection with or as a part of any type of stall warning system which utilizes an airflow or differential-pressure for control purposes. The novel feature of all of the various embodiments shown is that of so positioning the inlet and outlet openings, regardless of the particular form of the device that they are disposed substantially at right angles to each other, and so that they function to supply the maximum amount of pressure-differential under normal flight conditions.

In addition, these openings are so related that the predominating factor in producing the pressure-differential is the pressure head utilized by the front inlet opening. The outlet opening is so positioned and related to the inlet opening that it produces a slight suction effect and does not function to produce a pressure head under conditions of turbulent airflow which result when a stalling condition is approached or reached.

It is, to be understood, however, that the outlet opening positioned as it is in any one of the different embodiments disclosed, contributes in a large measure to maintaining the differential-pressure or airflow resulting therefrom at zero or near zero for the still higher angles of attack than where the stall warning was first initiated, that is, up to and including the condition where the plane actually stalls. This is an important feature as it gives the pilot a continuous warning signal after it is once initiated.

Another important feature of the various embodiments disclosed is that all of them are so constructed that they may be readily de-iced if necessary by means of suitable coverings, de-icing heater coils and the like.

These features make it possible to provide a pressure-differential device which is positive and reliable in operation and which has maximum sensitivity to the turbulent conditions of airflow when a stall is approached or in progress.

While I have disclosed specific embodiments of my invention and described them in detail, it will be apparent that the principles of my invention may be embodied in still other forms and modifications of those shown without departing from the spirit of my invention.

I claim as my invention:

1. A device for use on airplanes in conjunction with stall warning systems to produce a pressure-differential in accordance with airflow conditions over the upper surface of a wing of the plane comprising; a main elongated tubular member adapted to be mounted in a backwardly inclined position; said tubular member being closed at its rear end and having an inlet opening in its front nose facing the direction of airflow over the wing surface, a side opening adjacent the front opening, and a discharge opening adjacent its closed rear end; an auxiliary tubular member mounted concentrically within the main elongated member and extending out through the closed rear end thereof; said auxiliary tubular member having a closed front end in spaced relation to the inlet opening in the nose of the main tubular member and a side opening adjacent its closed front end connected with the side opening in the main tubular member.

2. A device for use on airplanes in conjunction with stall warning systems to produce a pressure-differential in accordance with airflow conditions over the upper surface of a wing of the plane comprising; a pair of elongated tubular members mounted one within the other in telescoping relation with the outer member open at the front nose and closed at its rear end around the inner member, said outer member having a pair of oppositely disposed side openings adjacent its front nose and a discharge opening adjacent its closed rear end, said inner member having a closed front end with a pair of opposed side openings adjacent thereto connected with the side openings in the outer member.

3. A device for use on airplanes in conjunction with stall warning systems to produce a pressure-differential in accordance with airflow conditions over the upper surface of a wing of the plane comprising; a pair of elongated tubular members mounted one within the other in telescoping realtion and in a backwardly inclined position, said outer member having a tapered nose portion with a front inlet opening and a pair of opposed side openings adjacent the front nose with its rear end opening closed about the inner member which extends therebeyond, said inner member having a closed front end adjacent the nose of the outer member and a pair of opposed side openings connected with the side openings in the outer member.

4. A device for use on airplanes in conjunction with stall warning systems to produce a pressure-differential in accordance with airflow conditions over the upper surface of a wing of the plane comprising; a base plate having an elongated opening therein; an outer elongated tubular member mounted in an inclined position on the base plate with its rear end portion extending through the elongated opening in the base plate, said outer member having an inlet opening in its front nose facing into the direction of airflow over the wing surface, a pair of opposed side openings adjacent thereto and a discharge opening adjacent its closed rear end; an inner elongated tubular member mounted within the outer member in concentric telescoping relation with its rear end extending through the closed rear end of the outer member, said inner member having a closed front end and a pair of opposed side openings adjacent thereto; and a tubular member connecting each side opening in the inner member with a corresponding side opening in the outer member.

HOWARD E. DYCHE, Jr.

REFERENCES CITED

The following references are of record in the file of this patent:

UNITED STATES PATENTS

| Number | Name | Date |
|---|---|---|
| 2,358,571 | Hall | Sept. 19, 1944 |
| 2,431,241 | Godsey | Nov. 18, 1947 |

FOREIGN PATENTS

| Number | Country | Date |
|---|---|---|
| 276,525 | Italy | Aug. 1, 1944 |